(12) United States Patent
Quix et al.

(10) Patent No.: US 11,097,597 B2
(45) Date of Patent: Aug. 24, 2021

(54) CONSUMPTION-OPTIMIZATION SYSTEM FOR MOTOR VEHICLES BY ADAPTING THE PASSENGER COMPARTMENT AIR CONDITIONING

(71) Applicant: Ford Global Technologies, LLC, Dearborn, MI (US)

(72) Inventors: Hans Guenter Quix, Herzogenrath (DE); Robert Hoenen, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 778 days.

(21) Appl. No.: 15/411,279

(22) Filed: Jan. 20, 2017

(65) Prior Publication Data
US 2017/0210203 A1 Jul. 27, 2017

(30) Foreign Application Priority Data
Jan. 22, 2016 (DE) .................... 102016200940.0

(51) Int. Cl.
*B60H 1/00* (2006.01)
*B60H 1/04* (2006.01)
*B60H 1/08* (2006.01)

(52) U.S. Cl.
CPC ..... *B60H 1/00985* (2013.01); *B60H 1/00314* (2013.01); *B60H 1/00885* (2013.01);
(Continued)

(58) Field of Classification Search
CPC ............ B60H 1/00985; B60H 1/00314; B60H 1/00885; B60H 1/08; B60H 1/04; B60H 1/00764
See application file for complete search history.

(56) References Cited

U.S. PATENT DOCUMENTS 4,498,309 A * 2/1985 Kobayashi ......... B60H 1/00828
 165/43
5,467,006 A * 11/1995 Sims .................. B60H 1/00642
 237/5
(Continued)

FOREIGN PATENT DOCUMENTS

EP 2416121 A2 * 2/2012 ......... G01C 21/3697
EP 2720000 A4 * 4/2015 ......... G01C 21/3469
(Continued)

OTHER PUBLICATIONS

STIC search report (Year: 2019).*

*Primary Examiner* — Christian Chace
*Assistant Examiner* — Michael F Whalen
(74) *Attorney, Agent, or Firm* — Geoffrey Brumbaugh; McCoy Russell LLP

(57) ABSTRACT

Methods and systems are provided for controlling an air conditioning system of a motor vehicle. In one example, a cabin of the vehicle may be heated firstly to a first temperature by flowing coolant to a heat exchanger, coolant may be diverted away from the heat exchanger and toward the engine in order to increase a temperature of the engine, and the coolant may then flow again to the heat exchanger in order to heat the cabin to a second temperature. An amount of fuel savings resulting from heating the engine by diverting coolant away from the heat exchanger may be displayed to an operator of the vehicle via a display device.

19 Claims, 3 Drawing Sheets

(52) U.S. Cl.
CPC ............... *B60H 1/04* (2013.01); *B60H 1/08* (2013.01); *B60H 1/00764* (2013.01)

(56) References Cited

U.S. PATENT DOCUMENTS

| | | | | |
|---|---|---|---|---|
| 7,027,912 B1* | 4/2006 | Metzger | ............. | B60H 1/00778 123/179.4 |
| 8,442,752 B2* | 5/2013 | Wijaya | ............... | B60H 1/00735 701/123 |
| 9,987,904 B2* | 6/2018 | Koyama | ................. | B60L 1/003 |
| 2006/0231640 A1* | 10/2006 | Hashimura | ............. | B60H 1/04 237/34 |
| 2009/0314847 A1* | 12/2009 | Nemoto | ............. | B60H 1/00764 237/5 |
| 2010/0274394 A1 | 10/2010 | Wijaya et al. | | |
| 2011/0067389 A1* | 3/2011 | Prior | ...................... | B60H 1/025 60/320 |
| 2011/0082594 A1 | 4/2011 | Dage et al. | | |
| 2011/0146945 A1* | 6/2011 | Morita | ............. | B60H 1/00764 165/51 |
| 2011/0160913 A1* | 6/2011 | Parker | ................. | F24D 19/1048 700/276 |
| 2012/0179329 A1* | 7/2012 | Okamoto | ........... | B60H 1/00735 701/36 |
| 2012/0253573 A1* | 10/2012 | Shigyo | ............. | B60H 1/00421 701/22 |
| 2013/0175022 A1* | 7/2013 | King | ................. | B60H 1/00392 165/202 |
| 2013/0274968 A1 | 10/2013 | Federico et al. | | |
| 2013/0332013 A1* | 12/2013 | Malone | ................. | B60H 1/004 701/22 |
| 2014/0012447 A1* | 1/2014 | Gao | ................... | B60L 11/1874 701/22 |
| 2014/0075966 A1* | 3/2014 | Schmitz | ............. | B60H 1/00921 62/56 |
| 2014/0102666 A1* | 4/2014 | Ichishi | ............... | B60H 1/00828 165/11.1 |
| 2014/0110489 A1* | 4/2014 | Yasui | ................... | B60N 2/0244 237/5 |
| 2015/0158367 A1* | 6/2015 | Jeong | ..................... | B60H 1/004 701/36 |
| 2016/0003621 A1* | 1/2016 | Koenig | ............... | G01C 21/00 701/31.4 |
| 2016/0031288 A1* | 2/2016 | Nishikawa | ............... | B60H 1/22 165/202 |
| 2016/0138878 A1* | 5/2016 | Gopal | ...................... | F01P 3/20 165/103 |
| 2016/0140780 A1* | 5/2016 | Kim | ......................... | G07C 5/02 701/123 |
| 2016/0369685 A1* | 12/2016 | Cho | ...................... | F01P 7/164 |
| 2017/0136847 A1* | 5/2017 | Lim | ................... | B60H 1/00735 |
| 2017/0328263 A1* | 11/2017 | Uhrich | .................... | F02M 26/06 |
| 2018/0056941 A1* | 3/2018 | Won | ................... | B60H 1/00785 |
| 2018/0236997 A1* | 8/2018 | Quix | ................ | B60W 50/0097 |
| 2018/0258874 A1* | 9/2018 | Okamoto | ................. | F01P 3/20 |
| 2018/0273211 A1* | 9/2018 | Chang | ...................... | B64F 5/40 |
| 2018/0312037 A1* | 11/2018 | Uesugi | ................. | B60K 23/00 |
| 2019/0039512 A1* | 2/2019 | Taki | ................. | B60Q 1/503 |
| 2019/0315184 A1* | 10/2019 | Kim | .................. | B60H 1/00035 |
| 2019/0315194 A1* | 10/2019 | Kim | .................. | B60H 1/00735 |
| 2019/0344635 A1* | 11/2019 | Stacey | ...................... | F01P 7/14 |
| 2020/0132064 A1* | 4/2020 | Takahashi | ............... | F04B 37/14 |
| 2020/0338957 A1* | 10/2020 | Kim | ......................... | F01P 7/026 |

FOREIGN PATENT DOCUMENTS

| | | |
|---|---|---|
| JP | 2006133010 A * | 5/2006 |
| JP | 2013220715 A | 10/2013 |

* cited by examiner

CONSUMPTION-OPTIMIZATION SYSTEM FOR MOTOR VEHICLES BY ADAPTING THE PASSENGER COMPARTMENT AIR CONDITIONING

CROSS REFERENCE TO RELATED APPLICATION

The present application claims priority to German Patent Application No. 102016200940.0, filed on Jan. 22, 2016. The entire contents of the above-referenced application are hereby incorporated by reference in its entirety for all purposes.

FIELD

The present description relates generally to methods and systems for controlling coolant flow through an air conditioning system of a motor vehicle.

BACKGROUND/SUMMARY

In motor vehicles, passenger compartment air conditioning can have a significant influence on fuel consumption. For example, coolant which has been heated after a cold start by the engine may be fed to a passenger compartment-heating heat exchanger in order to increase a temperature of a passenger compartment of a vehicle. Heat may be extracted from the coolant if a desired passenger compartment temperature which has been set is undershot (e.g., via automatic regulation). As a result, a heating rate of the engine may be delayed and fuel consumption may increase. An operator of the vehicle may temporarily set the desired passenger compartment temperature to a lower value in order to decrease a flow rate of coolant to the heat exchanger and permit a rapid heating of the engine at average external temperatures (e.g., 18° C.). However, the operator must then actively change the set desired compartment temperature back to the desired value after the normal engine working temperature has been reached in order to adjust the passenger compartment temperature to the desired temperature. Furthermore, the operator must again set the desired passenger compartment temperature to the lower value after each cold start in order to heat the engine quickly.

The air-conditioning system may also have an influence on the fuel consumption during cooling of the passenger compartment. When the air-conditioning system is switched on, a relatively high engine torque drives the air-conditioning compressor. Current vehicles are usually equipped with automatic regulation of the air-conditioning system via a controller. If the desired passenger compartment temperature which is set is exceeded, the air-conditioning system switches on automatically and the fuel consumption rises. The operator of the vehicle may switch off the air-conditioning system in order to avoid increasing the fuel consumption. However, cooling of the passenger compartment would then decrease. Alternatively, a relatively high setpoint temperature could also be set for the passenger compartment in order to reduce the running time of the air-conditioning system. However, if the operator of the vehicle later desires a lower passenger compartment temperature, the operator would need to once again adjust the set temperature to a lower value.

System devices for air-conditioning a passenger compartment are described inter alia in Japanese Patent 2013 2207 15, U.S. Patent 2010/0274394 A1, U.S. Patent 2011/0082594 A1 and U.S. Patent 2013/0274968 A1. The patents listed above are concerned in particular with balancing the thermal comfort of the vehicle occupants and the energy consumption during air-conditioning of the passenger compartment.

Japanese Patent 2013 2207 15 describes an air-conditioning device, wherein the user can input a level starting from which the climate of the passenger compartment is uncomfortable for said user. The air-conditioning system is then operated taking into account the level which has been input.

U.S. Patent 2010/0274394 A1 and U.S. Patent 2011/0082594 A1 describes a system with a comfort level display and a fuel economy display in which each comfort level is assigned a specific temperature range. No additional fuel is consumed from the time when a selected comfort range is reached.

U.S. Patent 2013/0274968 A1 describes a system in which the driver and/or the vehicle occupant of an electric vehicle can select the desired rate of change of temperature from various options and, in particular, can contribute to lower fuel consumption by selecting a lower rate of change.

Against the described background, the object of the present disclosure is to make available a method for operating a motor vehicle and a motor vehicle which permit the driver to optimize the fuel consumption with adapted passenger compartment air conditioning, that is to say to actively reduce the fuel consumption.

In one example, the issues described above may be addressed by a method for operating a motor vehicle including an engine, a passenger compartment, and a system device for passenger compartment air conditioning with a passenger compartment-heating heat exchanger, the method comprising: defining a passenger compartment temperature setpoint value $T_0$ and a minimum passenger compartment temperature value $T_1$; and operating the system device for passenger compartment air conditioning by flowing coolant which has been heated by the engine to the passenger compartment-heating heat exchanger only when a temperature T of the passenger compartment is lower than the minimum passenger compartment temperature value $T_1$ or the engine has reached a pre-determined operating temperature. In this way, coolant may flow through the heat exchanger in order to heat the passenger compartments to a set minimum temperature, and then coolant may be redirected to flow through the engine in order to increase a temperature of the engine to a normal operating temperature and reduce fuel consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
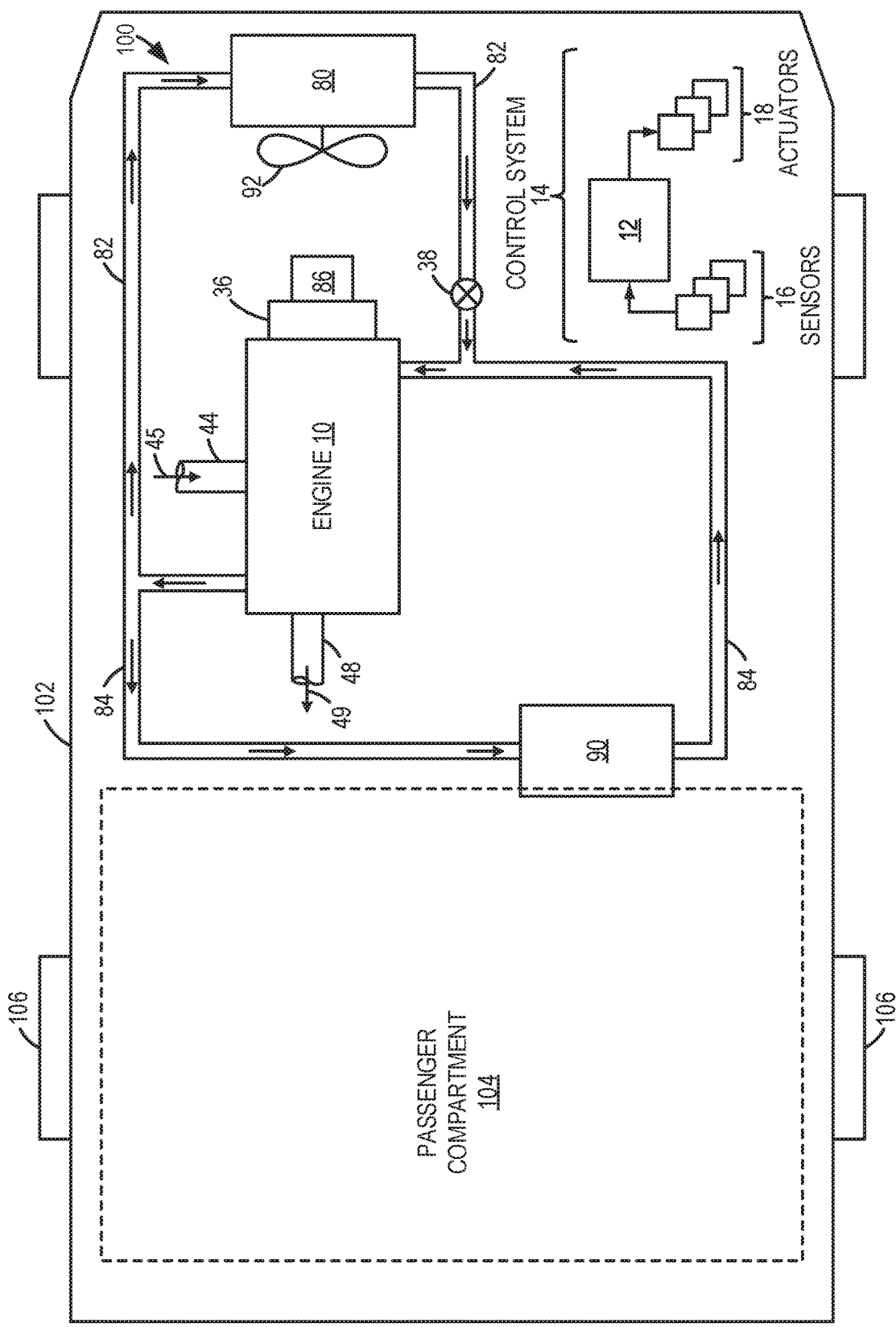
FIG. 1 shows a schematic diagram of a motor vehicle including an air-conditioning system.

The method for operating a motor vehicle relates to a motor vehicle which comprises an engine, a passenger compartment and a system device for passenger compartment air conditioning with a passenger compartment-heating heat exchanger. The method comprises the following steps: firstly a passenger compartment temperature setpoint value T0 and a minimum passenger compartment temperature value T1 are defined. Then, the system device for passenger compartment air conditioning is operated, wherein coolant which has been heated by the engine is fed to the passenger compartment-heating heat exchanger only when the actual temperature T in the passenger compartment is lower than the defined minimum passenger compartment temperature value T1 and/or when the engine has reached its operating temperature.

In other words, the passenger compartment is therefore firstly adjusted or heated only to the defined minimum passenger compartment temperature T1, and the engine is heated to its operating temperature with priority before further heating. In the event of the actual temperature T in the passenger compartment already being above the defined minimum passenger compartment temperature value T1, firstly the engine is heated exclusively to its operating temperature, and only then is coolant which has been heated by the engine fed to the passenger compartment-heating heat exchanger to increase the temperature in the passenger compartment to the defined passenger compartment temperature setpoint value T0.

The motor vehicle can be, for example, a passenger car (PKW) or a truck (LKW). The passenger compartment temperature setpoint value T0 and/or the minimum passenger compartment temperature value T1 can basically be defined by a vehicle occupant, such as the driver or a front-seat passenger.

The described method has the advantage that it permits optimization of the fuel consumption, wherein the driver or the vehicle occupant is able to actively reduce the fuel consumption by correspondingly defining the passenger compartment temperature setpoint value and the minimum passenger compartment temperature value. Furthermore, the method permits more rapid heating of the engine for cold or low external temperatures, as a result of which the fuel consumption is reduced.

Furthermore, if the engine has reached its operating temperature and the actual temperature T in the passenger compartment is lower than the defined passenger compartment temperature setpoint value T0, that is to say $T<T0$, by means of the described method coolant which is heated by the engine can be fed to the passenger compartment-heating heat exchanger until the actual temperature T in the passenger compartment is equal to or higher than the passenger compartment temperature setpoint value T0, that is to say until $T \geq T0$.

Moreover, a maximum passenger compartment temperature value T2 can be defined and an air-conditioning system can be activated only if the actual temperature T in the passenger compartment is higher than the defined maximum passenger compartment temperature value T2 and the air-conditioning system is operated only until the maximum passenger compartment temperature T2 is reached.

The described method permits the driver to optimize actively the fuel consumption with adapted passenger compartment air conditioning. The system can be used for cold external temperatures for relatively rapid heating of the engine as well as for reducing the running times of the air-conditioning system in that a maximum limiting temperature T2 is also input by the driver. In this case, by activating the air-conditioning system the passenger compartment temperature is regulated only to the value T2 and not to the setpoint temperature which has actually been set. A further reduction in the passenger compartment temperature to the setpoint temperature which has been set for the passenger compartment air conditioning would take place only by means of measures which bring about no increase in consumption (such as e.g., during braking phases or by cooling with air from the outside in the case of ambient temperatures below T2).

In addition, the actual fuel consumption can be determined. Moreover, a hypothetical first fuel consumption can be determined under the assumption that the passenger compartment temperature setpoint value T0 is reached as quickly as possible. Then, the difference between the actual fuel consumption and the hypothetical first fuel consumption can be determined, for example calculated.

For example, the actual fuel consumption can be determined by a cold start of the engine up to the time when the passenger compartment temperature setpoint value T0 in the passenger compartment is reached, and the time t necessary for this, from the cold start of the engine until the passenger compartment temperature setpoint value T0 is reached can be determined. A hypothetical first fuel consumption within the time t given an assumed supply of coolant which has been heated by the engine to the passenger compartment-heating heat exchanger with the objective of reaching the passenger compartment temperature setpoint value T0 as quickly as possible can be estimated or determined.

Basically, from the difference or from some other determination, the fuel which is saved by the application of the described method can be determined or calculated as a saving per 100 km or as a saving since the last refueling operation or as a saving since the last time the engine was started. The determined difference or a fuel saving derived therefrom or in some other way can be displayed on a display in the motor vehicle. For example, the saving during the last journey by applying the described method or a saving since the last refueling process by applying the described method can be displayed, for example in liters per 100 km.

Furthermore, a hypothetical second fuel consumption can be determined for the case in which a lower minimum passenger compartment temperature value than the actually defined minimum passenger compartment temperature value T1 is defined. The difference between the first hypothetical fuel consumption and the second hypothetical fuel consumption can be determined, for example calculated. The difference or a fuel saving derived therefrom can be displayed on a display in the motor vehicle. In this context, for example the saving in the case of a further reduction of the minimum passenger compartment temperature value to a specific temperature can be displayed, preferably in liters per 100 km.

Furthermore, the difference between the actual fuel consumption and the second hypothetical fuel consumption can be determined, for example calculated. This difference or a fuel saving derived therefrom can be displayed on a display in the motor vehicle.

As an alternative or in addition, the absolute saving can be displayed for a specific minimum passenger compartment temperature value which is defined on a test basis by a vehicle occupant and is lower than the minimum passenger compartment temperature value defined last, for example in liters per 100 km.

The motor vehicle comprises an engine, a passenger compartment and a system device for passenger compartment air conditioning with a passenger compartment-heating heat exchanger and a device for inputting a passenger compartment temperature setpoint value T0. The system device for passenger compartment air conditioning comprises a device for inputting a minimum passenger compartment temperature value T1 and is configured to operate according to the method described above.

The engine comprises, for example, a radiator with a coolant. The system device for passenger compartment air conditioning comprises, for example, fluid ducts which conduct coolant from the engine radiator to the passenger compartment-heating heat exchanger.

The motor vehicle can be a passenger car, a truck or some other motor vehicle.

In a memory device data for an application program is stored, which application program when executed by a processor in a motor vehicle causes the motor vehicle to operate according to the method described above. In other words, the execution of the described method is therefore made possible and is made available to a motor vehicle occupant as an application. In particular, in this way retrofitting of existing systems is possible.

The present disclosure has the advantage that the driver or the vehicle occupant assumes an active role in conjunction with specific reduction of fuel consumption. This promotes the driver's acceptance of behavior which is economical in terms of fuel, since the driver actively dispenses with driving comfort in favor of increased fuel efficiency. Since the driver can respectively set the minimum passenger compartment temperature value individually, he can assume responsibility for himself depending on the situation to determine the driving comfort which he desires and can cause the fuel saving which is specifically brought about as a result to be displayed. This immediate feedback contributes basically to improved consciousness on the part of the vehicle occupant in respect of matters concerning fuel economy. Overall, the present disclosure reduces the emission of carbon dioxide, since the fuel consumption decreases.

Further features, properties and advantages of the present disclosure are described in more detail below on the basis of exemplary embodiments and with reference to the appended figures. All the features described hitherto and below are advantageous both individually and in any desired combination with one another here. The exemplary embodiments described below constitute merely examples which, however, do not restrict the subject matter of the present disclosure.

Turning now to FIG. 1, an example embodiment of a vehicle heating, ventilation and air-conditioning (HVAC) system 100 (herein also referred to as cabin heating system) in a motor vehicle 102 is illustrated schematically. Vehicle 102 has drive wheels 106, a passenger compartment 104 (herein also referred to as cabin), and an engine compartment including an internal combustion engine 10. Internal combustion engine 10 has a combustion chamber which may receive intake air 45 via intake passage 44 and may exhaust combustion gases 49 via exhaust passage 48. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

HVAC system 100 circulates coolant through internal combustion engine 10 to absorb waste engine heat and distribute the heated coolant to radiator 80 and/or heater core 90 via coolant lines 82 and 84, respectively. As shown, HVAC system 100 is coupled to engine 10 and circulates engine coolant from engine 10 to radiator 80 via an engine-driven water pump 86, and back to engine 10 via coolant line 82. Engine-driven water pump 86 may be coupled to the engine via front end accessory drive (FEAD) 36, and rotated in proportion with engine speed via a belt, chain, etc. Specifically, engine-driven pump 86 circulates coolant through passages in the engine block, head, etc., to absorb engine heat, which is then transferred via the radiator 80 to ambient air. In one example, where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in cooling line 82, which may be kept closed until the coolant reaches a threshold temperature.

Further, a fan 92 may be coupled to radiator 80 in order to maintain an airflow through radiator 80 when vehicle 102 is moving slowly or stopped while the engine is running. In some examples, fan speed may be controlled by a controller 12. Alternatively, fan 92 may be coupled to engine-driven water pump 86.

Hot coolant may flow through coolant line 82, as described above, and/or through coolant line 84 to heater core 90 where the heat may be transferred to passenger compartment 104, and the coolant flows back to engine 10. Heater core 90 may thus act as a heat exchanger between the coolant and the passenger compartment 104. Fins may be attached to the heater core to increase the surface area for heat transfer. Air may be forced past the fins, for example by operating a fan, to expedite heating of the passenger compartment.

In some examples, engine-driven pump 86 may operate to circulate the coolant through both coolant lines 82 and 84. In other examples, where vehicle 102 has a hybrid-electric propulsion system, an electric auxiliary pump (not shown) may be included upstream of the heater core in the HVAC system, in addition to the engine-driven pump. Therein, the auxiliary pump may be employed to circulate coolant through heater core 90 during occasions when engine 10 is off (e.g., electric only operation) and/or to assist engine-driven pump 86 when the engine is running. Like engine-driven pump 86, the auxiliary pump may be a centrifugal pump; however, the pressure (and resulting flow) produced by the auxiliary pump may be proportional to an amount of power supplied to the pump by a system energy storage device (not shown).

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), HVAC system sensors (such as coolant temperature, fan speed, passenger compartment temperature, ambient humidity, etc.), and others.

Further, controller 12 may communicate with various actuators 18, which may include engine actuators (such as fuel injectors, an electronically controlled intake air throttle plate, spark plugs, transmission clutches, etc.), HVAC system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat generated by the engine and transferred to the coolant may affect the amount of heat that may be transferred to the passenger compartment to provide cabin heating. For example, during engine idling conditions, the amount of waste heat generated may be proportionally reduced, thereby reducing an amount of cabin heating available. Further, during such conditions, cabin heating may be substantially slow. As elaborated herein with reference to FIGS. 2-3, during vehicle idling conditions, with gear selector 108 in P or N positions, in response to a request for cabin heating and/or in response to a passenger compartment temperature falling below a threshold, the controller may be configured to perform a transmission grounding routine. Specifically, the controller may be configured to lock transmission output while increasing engine input to thereby selectively increase an amount of waste idle heat that is generated, and circulate the waste heat through the cabin heating system via coolant. In this way, by generating waste heat during vehicle idling, HVAC system fluid heating may be expedited, thereby enabling rapid cabin heating.

The present disclosure is firstly explained below using two specific examples and subsequently explained in the form of more general embodiment variants with reference to FIGS. 1-3.

In a first example, which relates to the warming up of the engine, the cold start of the engine starts at 18° C., with the passenger compartment temperature also being 18° C., and the passenger compartment air conditioning being set to 22° C. The passenger compartment temperature setpoint value T0 has therefore been defined as 22° C. The driver then activates an expanded consumption-optimization system (which may be referred to herein as ECOS) which is made available in order to carry out the methods described below. The ECOS may have already been previously activated. Within the scope of the ECOS, the option of consumption-optimization of the passenger compartment air conditioning is made available and is selected by the driver. The limiting temperature T1 is input by the driver, for example, the driver inputs a minimum passenger compartment temperature value T1 of 16° C.

The expanded consumption-optimization system ECOS then optimizes the fuel consumption using the system device for passenger compartment air conditioning, taking into account the limiting values which have been input. The display of the passenger compartment air conditioning is still at 22° C., but the system does not feed any heated coolant to the heater, since the current passenger compartment temperature of 18° C. is above the defined limiting value of 16° C. which has been input into the system. Only if the engine is sufficiently heated and a reduction in consumption can no longer be achieved is heated coolant fed to the heater. Then, the saving in consumption is displayed once it has been achieved. Furthermore, the savings in consumption over a relatively long time period can also be displayed and evaluated statistically, for example in the case of a refueling process.

In a second example, which relates to the air-conditioning system operation, the start of the engine is at 25° C. external temperature. The passenger compartment temperature is 35° C., and the passenger compartment air conditioning is at 22° C. The passenger compartment temperature setpoint value T0 has therefore been defined as 22° C. The driver activates the "expanded consumption-optimization system" ECOS or it has already been previously activated. Within the scope of the ECOS, the driver selects the option of consumption-optimization of the passenger compartment air conditioning. The limiting temperatures T1 and T2 are input by the driver, for example the driver inputs a minimum passenger compartment temperature value T1 of 16° C. and a maximum passenger compartment temperature value T2 of 24° C.

The system then optimizes the fuel consumption with the limiting values which have been input. The display of the passenger compartment air conditioning is still at 22° C., but the system activates the air-conditioning system only until a passenger compartment temperature of 24° C. is reached. The passenger compartment temperature is reduced further only by other consumption-neutral measures such as e.g., switching on the air-conditioning compressor during the braking phases or by cooling with air from the outside. Then, the saving in consumption can be displayed once it has been achieved. Furthermore, the savings in consumption over a relatively long time period can also be displayed and evaluated statistically, e.g., during a refueling process.

Figure 2:
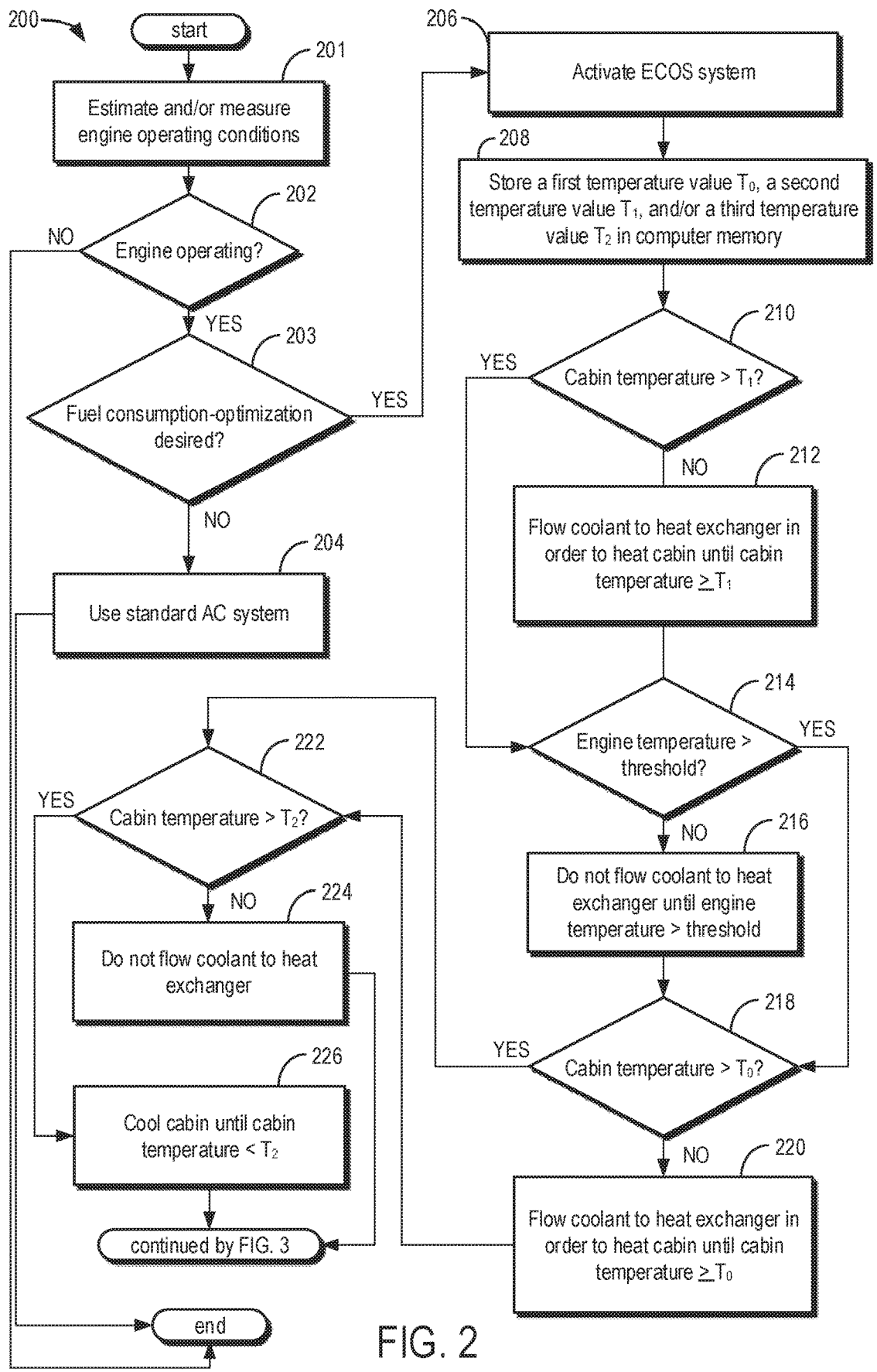
FIG. 2 shows an example method for adjusting operation of a vehicle air conditioning system responsive to various threshold temperatures.

FIG. 2 shows an example method 200 for adjusting operation of an air-conditioning system (such as the HVAC system 100 shown by FIG. 1 and described above) of a vehicle including an engine in response to various cabin (e.g., passenger compartment) and engine temperatures.

At 201, the method includes estimating and/or measuring engine operating conditions based on one or more outputs of various sensors in the engine system and/or operating conditions of the engine system (e.g., such as various temperature sensors, pressure sensors, etc., as described above). Engine operating conditions may include engine speed and load, coolant temperature, mass air flow rate, coolant flow rate, fuel injection amount, etc.

The method continues t 202 where the method includes determining whether the engine is operating. For example, the engine may be operating when the engine is on and combusting a mixture of fuel and air. The engine may not be operating when the engine is off and combustion of fuel and air within engine cylinders is not occurring. In some examples in which the engine system may be a hybrid-electric engine system, the engine may not be operating when the engine is off, combustion of fuel and air within engine cylinders is not occurring, and an electric motor used to propel the vehicle is not energized.

If the engine is operating at 202, the method continues to 203 where the method includes determining whether fuel-consumption optimization is desired. In one example, the vehicle occupant, for example the driver, can decide whether he would like to use an "expanded consumption-optimization system" ECOS. The operator may make a selection to use ECOS on a user-interface device (e.g., a touchscreen). Operating the air conditioning system with the ECOS may provide a decreased rate of fuel consumption relative to operating the air conditioning system without the ECOS.

If fuel-consumption optimization is not desired at 203, the method continues to 204 where the method includes using a standard air-conditioning system to control cabin temperature. For example, the standard air-conditioning system used for passenger compartment air conditioning may be a system different from ECOS (e.g., a system in which operation of the system is not adjusted in response to cabin and/or engine temperatures). In some examples, the standard air-conditioning system may utilize the same components as ECOS (e.g., the same coolant lines, heat exchanger, etc.).

If fuel-consumption optimization is desired at 203, the method continues to 206 where the method includes activating the ECOS system of the vehicle. Activating ECOS may include initiating a control routine of the controller to adjust operation of the air conditioning system in response to cabin and/or engine temperatures.

The method then continues to 208 where the method include storing a first temperature value T0, a second temperature value T1, and/or a third temperature value T2 in computer memory. The values T0, T1, and T2 are defined by the operator of the vehicle. In one example, T1 is a minimum passenger compartment temperature value, T2 is a maximum passenger compartment temperature value, and T0 is a desired passenger compartment temperature value.

The method then continues to 210 where the method includes determining whether a cabin temperature is greater than the second temperature value T1.

If the cabin temperature is not greater than the second temperature value T1 at 210, the method continues to 212 where the method includes flowing coolant to a heat exchanger in order to heat the cabin until the cabin temperature is greater than the second temperature value T1. In this context, coolant which has been heated by the engine is fed to the passenger compartment-heating heat exchanger when the actual temperature in the passenger compartment is lower than the defined minimum passenger compartment temperature value T1.

If the cabin temperature is greater than the second temperature value T1 at 210 or if coolant flows to the heat exchanger at 212, the method continues to 214 where the method includes determining whether an engine temperature is greater than a threshold engine temperature. In one example, the threshold engine temperature may be a normal operating temperature of the engine (e.g., a temperature of the engine during low-to-medium engine loads).

If the engine temperature is not greater than the threshold engine temperature at 214, the method continues to 216 where the method includes not flowing coolant to the heat exchanger until the engine temperature is greater than the threshold engine temperature. This may accelerate heating of the engine after a cold start (e.g., switching from a non-operational engine mode to an operational engine mode) by reducing a running time of the air-conditioning system.

If the actual temperature T in the passenger compartment has reached the defined minimum passenger compartment temperature T1, the engine is preferably heated to its operating temperature, that is to say firstly no further coolant which has been heated by the engine is fed to the passenger compartment-heating heat exchanger.

If the engine temperature is greater than the threshold engine temperature at 214 or if coolant does not flow to the heat exchanger at 216, the method continues to 218 where the method includes determining whether the cabin temperature is greater than the first temperature value T0.

If the cabin temperature is not greater than the first temperature value T0 at 218, the method continues to 220 where the method includes flowing coolant to the heat exchanger in order to heat the cabin until the cabin temperature is greater than the first temperature value T0. For example, coolant is fed to the passenger compartment-heating heat exchanger in order to first heat the passenger compartment to a temperature above the defined limiting value T1, and then to heat it to the passenger compartment temperature setpoint value T0 which is above the limiting value T1.

If the cabin temperature is greater than the first temperature value T0 at 218 or if coolant flows to the heat exchanger at 220, the method continues to 222 where the method includes determining whether the cabin temperature is greater than the third temperature value T2.

If the cabin temperature is not greater than the third temperature value T2 at 222, the method continues to 224 where the method includes not flowing coolant to the heat exchanger. For example, the cabin temperature may be between the first temperature value T0 and the third temperature value T2 at 222. As a result, in order to reduce fuel consumption of the engine, the cabin is not cooled to the first temperature value T0 and is not heated via the heat exchanger. The method then continues to FIG. 3 as described below.

If the cabin temperature is greater than the third temperature value T2 at 222, the method continues to 226 where the method includes cooling the cabin temperature until the cabin temperature is less than the third temperature value T2. For example, a compressor of the air conditioning system may be energized in order to blow cooled air into the cabin and reduce the cabin temperature until the cabin temperature is below the third temperature value T2. However, in order to reduce fuel consumption, cooling of the cabin stops after the cabin temperature decreases below the third temperature value T2 and before the cabin temperature reaches the desired temperature value T0. The method then continues to FIG. 3 as described below.

Figure 3:
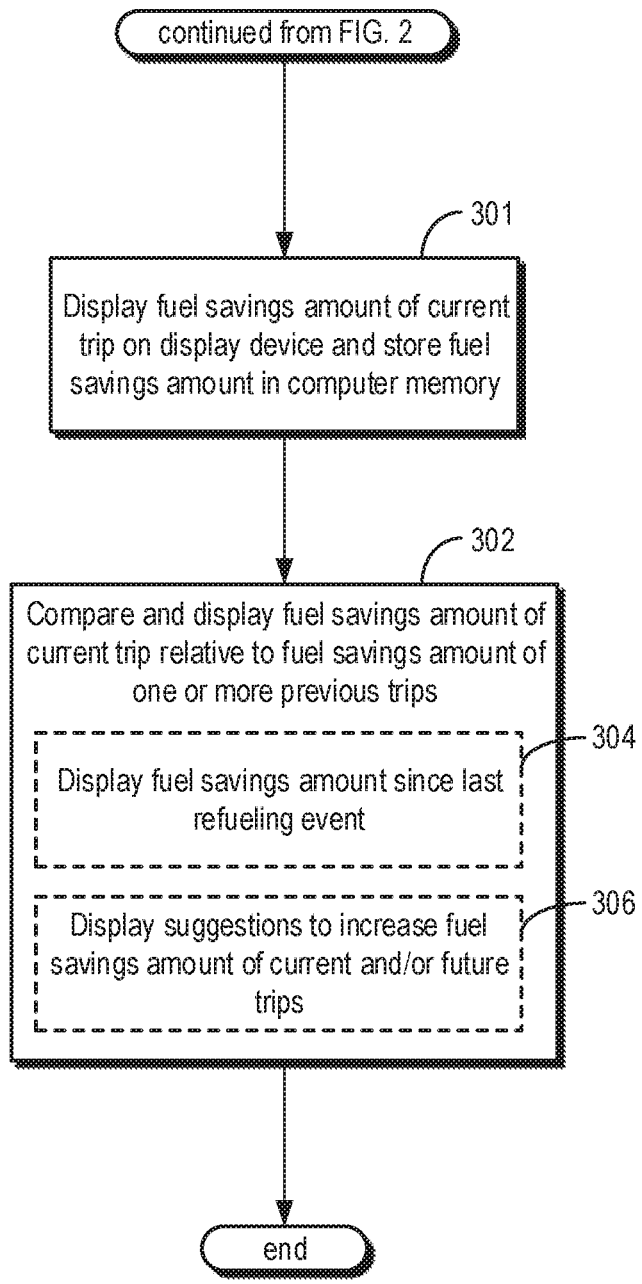
FIG. 3 shows a continuation of the method shown by FIG. 2 and includes examples of displaying fuel savings information to an operator of a vehicle.

FIG. 3 shows a continuation of the method 200 shown by FIG. 2. The method continues from 224 or 226 shown by FIG. 2 to 301 shown by FIG. 3 where the method includes displaying a fuel savings amount of a current trip on a display device and storing the fuel savings amount into computer memory. In one example, the fuel savings amount may be a fuel savings rate measured over a duration of engine operation. The fuel savings rate may be measured by measuring a coolant flow rate and an engine load and comparing the values to values stored in a lookup table within non-transitory memory of the controller. In one example, the current trip may be a duration of time between a most recent cold start of the engine and an engine shutoff event following the most recent cold start. In some examples, the fuel savings amount may be an amount measured in liters per 100 km, e.g., 0.15 1/100 km.

The method continues to 302 where the method includes comparing and displaying the fuel savings amount of the current trip relative to a fuel savings amount of one or more previous trips. For example, prior to the current trip, a fuel savings rate for one or more previous trips may have been stored into the memory of the controller. The controller may compute a difference between the fuel savings rate of the current trip and a fuel savings rate of one or more of the previous trips in order to present the value of the calculated difference to the operator of the vehicle via a display device. The method optionally includes displaying a fuel savings amount since last refueling event at 304 and/or displaying suggestions to increase a fuel savings amount of current and/or future trips at 306. As an example, the corresponding display device may read "with your current driving profile and with a T1 temperature reduced further to 15° C. you could achieve a fuel saving of 0.25 1/100 km by means of ECOS". For example, the controller may recommend decreasing a value of the first temperature value T0 to the operator of the vehicle in order to reduce a duration of coolant flow to the heat exchanger and thereby increase a speed with which the engine reaches its operating temperature. In this way, a fuel consumption of the engine may be reduced by expediting the heating of the engine.

In one embodiment, a method for operating a motor vehicle including an engine, a passenger compartment, and a system device for passenger compartment air conditioning with a passenger compartment-heating heat exchanger includes: defining a passenger compartment temperature setpoint value T0 and a minimum passenger compartment temperature value T1; and operating the system device for passenger compartment air conditioning by flowing coolant which has been heated by the engine to the passenger compartment-heating heat exchanger only when a temperature T of the passenger compartment is lower than the minimum passenger compartment temperature value T1 or the engine has reached a pre-determined operating temperature. In a first example of the method, if the engine has reached the pre-determined operating temperature and the temperature T of the passenger compartment is lower than the defined passenger compartment temperature setpoint value T0, coolant which has been heated by the engine is fed to the passenger compartment-heating heat exchanger until the temperature T of the passenger compartment is equal to or higher than the passenger compartment temperature setpoint value T0. A second example of the method optionally includes the first example, and further includes wherein a maximum passenger compartment temperature value T2 is defined and a passenger compartment cooling device is activated only if the actual temperature T in the passenger compartment is higher than the defined maximum passenger compartment temperature value T2 and the passenger compartment cooling device is operated only until the maximum passenger compartment temperature value T2 is reached. A third example of the method optionally includes one or both of the first and second examples, and further includes: determining an engine fuel consumption amount for a duration of not flowing coolant to the passenger compartment-heating heat exchanger; determining a hypothetical first fuel consumption amount for a duration of flowing coolant to the passenger compartment-heating heat exchanger in order to increase the temperature T of the passenger compartment to the temperature setpoint value T0; and determining a difference in value between the engine fuel consumption amount and the hypothetical first fuel consumption amount. A fourth example of the method optionally includes one or more or each of the first through third examples, and further includes wherein the difference in value between the engine fuel consumption amount and the hypothetical first fuel consumption amount is displayed on a display device in the motor vehicle. A fifth example of the method optionally includes one or more or each of the first through fourth examples, and further includes wherein a hypothetical second fuel consumption amount is determined for a duration in which coolant flows to the passenger compartment-heating heat exchanger in order to increase the temperature T of the passenger compartment to a lower minimum passenger compartment temperature value than the actual passenger compartment temperature value T1, and a difference between the first hypothetical fuel consumption amount and the second hypothetical fuel consumption amount is determined. A sixth example of the method optionally includes one or more or each of the first through fifth examples, and further includes wherein the difference between the first hypothetical fuel consumption amount and the second hypothetical fuel consumption amount is displayed on a display device in the motor vehicle.

In one embodiment, a motor vehicle includes: an engine; a passenger compartment; a system device for passenger compartment air conditioning including a passenger compartment-heating heat exchanger; and a device for inputting a passenger compartment temperature setpoint value T0 and a minimum passenger compartment temperature value T1, wherein the temperatures T0 and T1 are stored in a memory device including data for an application program executable by a controller of the motor vehicle.

In another embodiment, a method includes: adjusting operation of a cabin air conditioning system of a vehicle responsive to a first cabin threshold temperature, second cabin threshold temperature, and third cabin threshold temperature received by a controller; measuring a first fuel consumption rate of an engine; and displaying the first fuel consumption rate and a pre-determined fuel consumption rate associated with a non-operational mode of the cabin air conditioning system. In a first example of the method, the first fuel consumption rate and an associated engine operating duration are each stored into computer-readable memory between each engine cold start and subsequent engine shut-off event. A second example of the method optionally includes the first example, and further includes wherein adjusting operation of the cabin air condition system includes: responsive to a measured vehicle cabin temperature being less than the first cabin threshold temperature, flowing coolant of an engine coolant system through a heat exchanger configured to heat the vehicle cabin. A third example of the method optionally includes one or both of the first and second examples, and further includes wherein adjusting operation of the cabin air condition system includes: responsive to a vehicle cabin temperature being greater than the first threshold temperature and an engine temperature being less than a threshold engine temperature, flowing coolant to the engine and not flowing coolant through the heat exchanger. A fourth example of the method optionally includes one or more or each of the first through third examples, and further includes wherein adjusting operation of the cabin air condition system includes: responsive to each of a vehicle cabin temperature being greater than the first cabin threshold temperature, an engine temperature being greater than an engine threshold temperature, and the vehicle cabin temperature being less than a second cabin threshold temperature, flowing coolant of an engine coolant system through a heat exchanger configured to heat the vehicle cabin. A fifth example of the method optionally includes one or more or each of the first through fourth examples, and further includes wherein adjusting operation of the cabin air condition system includes: responsive to a vehicle cabin temperature being greater than the first cabin threshold temperature, second cabin threshold temperature, and third cabin threshold temperature, energizing a compressor of the cabin air conditioning system to flow cooled air into the vehicle cabin and not flowing coolant of an engine coolant system through a heat exchanger configured to heat the vehicle cabin. A sixth example of the method optionally includes one or more or each of the first through fifth examples, and further includes comparing the first fuel consumption rate to a second fuel consumption rate stored in the computer-readable memory and displaying a difference between the first fuel consumption rate and second fuel consumption rate on a display device within the vehicle cabin, wherein the first fuel consumption rate corresponds to an average rate of fuel consumed by the engine for a duration since a most recent cold start of the engine, and wherein the second fuel consumption rate corresponds to an average rate of fuel consumed by the engine prior to the most recent cold start and following a cold start immediately prior to the most recent cold start. A seventh example of the method optionally includes one or more or each of the first through sixth examples, and further includes comparing the first fuel consumption rate to a second fuel consumption rate stored in the computer-readable memory and displaying a difference between the first fuel consumption rate and second fuel consumption rate on a display device within the vehicle cabin, wherein the first fuel consumption rate corresponds to an average rate of fuel consumed by the engine for a duration since a most recent refueling event of the vehicle, and wherein the second fuel consumption rate corresponds to an average rate of fuel consumed by the engine prior to the most recent refueling event and following a refueling event immediately prior to the most recent refueling event. An eighth example of the method optionally includes one or more or each of the first through seventh examples, and further includes wherein the first fuel consumption rate is measured by the controller by measuring a temperature of coolant flowing through the engine and an amount of engine load. A ninth example of the method optionally includes one or more or each of the first through eighth examples, and further includes wherein the first cabin threshold temperature is a minimum cabin temperature, the second cabin threshold temperature is an operator-desired cabin temperature, and the third cabin threshold temperature is a maximum cabin temperature. A tenth example of the method optionally includes one or more or each of the first through ninth examples, and further includes displaying the first fuel consumption rate, the first cabin threshold temperature, a predicted fuel consumption rate, and a fourth cabin threshold temperature on a display device, where the fourth cabin threshold temperature is determined by the controller and is less than the first threshold temperature, and where the predicted fuel consumption rate is estimated by the controller by replacing the first cabin threshold temperature with the fourth cabin threshold temperature. An eleventh example of the method optionally includes one or more or each of the first through tenth examples, and further includes displaying the first fuel consumption rate, the third cabin threshold temperature, a predicted fuel consumption rate, and a fourth cabin threshold temperature on a display device, with the fourth cabin threshold temperature being determined by the controller and being greater than the third threshold temperature, and with the predicted fuel consumption rate being estimated by the controller by replacing the third cabin threshold temperature with the fourth cabin threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a motor vehicle including an engine, a passenger compartment, and a system device for passenger compartment air conditioning with a passenger compartment-heating heat exchanger, the method comprising:

defining a passenger compartment temperature setpoint value T0 and a minimum passenger compartment temperature value T1;

operating the system device for passenger compartment air conditioning by flowing coolant which has been heated by the engine to the passenger compartment-heating heat exchanger only when a temperature T of the passenger compartment is lower than the minimum passenger compartment temperature value T1 or the engine has reached a pre-determined operating temperature;

determining an engine fuel consumption amount for a duration of not flowing coolant to the passenger compartment-heating heat exchanger;

determining a hypothetical first fuel consumption amount for a duration of flowing coolant to the passenger compartment-heating heat exchanger in order to increase the temperature T of the passenger compartment to the temperature setpoint value T0; and determining a difference in value between the engine fuel consumption amount and the hypothetical first fuel consumption amount;

wherein a hypothetical second fuel consumption amount is determined for the duration in which coolant flows to the passenger compartment-heating heat exchanger in order to increase the temperature T of the passenger compartment to a lower minimum passenger compartment temperature value than the minimum passenger compartment temperature value T1, and a difference between the first hypothetical fuel consumption amount and the hypothetical second fuel consumption amount is determined.

2. The method of claim 1, wherein if the engine has reached the pre-determined operating temperature and the temperature T of the passenger compartment is lower than the defined passenger compartment temperature setpoint value T0, coolant which has been heated by the engine is fed to the passenger compartment-heating heat exchanger until the temperature T of the passenger compartment is equal to or higher than the passenger compartment temperature setpoint value T0.

3. The method of claim 1, wherein a maximum passenger compartment temperature value T2 is defined and a passenger compartment cooling device is activated only if the actual temperature T in the passenger compartment is higher than the defined maximum passenger compartment temperature value T2 and the passenger compartment cooling device is operated only until the maximum passenger compartment temperature value T2 is reached.

4. The method of claim 1, wherein the difference in value between the engine fuel consumption amount and the hypothetical first fuel consumption amount is displayed on a display device in the motor vehicle.

5. The method of claim 1, wherein the difference between the first hypothetical fuel consumption amount and the second hypothetical fuel consumption amount is displayed on a display device in the motor vehicle.

6. A method, comprising:
adjusting operation of a cabin air conditioning system of a vehicle responsive to activation of a consumption optimization mode, a first cabin threshold temperature, a second cabin threshold temperature, and a third cabin threshold temperature received by a controller;
the consumption optimization mode comprising controlling coolant flow to a cabin heat exchanger based on engine temperature;
measuring a first fuel consumption rate of an engine;
estimating a projected fuel consumption rate based on: activation of the consumption optimization mode of the cabin air conditioning system, an adjustment of the first cabin threshold temperature from a current cabin threshold temperature, and flowing coolant to the cabin heat exchanger;
displaying the first fuel consumption rate and the projected fuel consumption rate;
determining a hypothetical first fuel consumption amount for a duration of flowing coolant to the passenger compartment-heating heat exchanger in order to increase the temperature T of the passenger compartment to the second cabin threshold temperature;
determining a hypothetical second fuel consumption amount for the duration in which coolant flows to the passenger compartment-heating heat exchanger in order to increase the temperature T of the passenger compartment to the first cabin threshold temperature which is lower than the second cabin threshold temperature; and
determining a difference between the first hypothetical fuel consumption amount and the hypothetical second fuel consumption amount.

7. The method of claim 6, wherein the first fuel consumption rate and an associated engine operating duration are each stored into computer-readable memory between each engine cold start and subsequent engine shut-off event.

8. The method of claim 6, wherein adjusting operation of the cabin air conditioning system in the consumption optimization mode includes:
responsive to a measured vehicle cabin temperature being less than the first cabin threshold temperature, flowing coolant of an engine coolant system through a heat exchanger configured to heat a vehicle cabin.

9. The method of claim 6, wherein adjusting operation of the cabin air conditioning system in the consumption optimization mode includes:
responsive to a vehicle cabin temperature being greater than the first cabin threshold temperature and an engine temperature being less than a threshold engine temperature, flowing coolant to the engine and not flowing coolant through a heat exchanger, and
responsive to the measured vehicle cabin temperature being less than the first cabin threshold temperature, flowing coolant of an engine coolant system through a heat exchanger configured to heat a vehicle cabin regardless of the engine temperature.

10. The method of claim 6, wherein adjusting operation of the cabin air conditioning system in the consumption optimization mode includes:
responsive to each of a vehicle cabin temperature being greater than the first cabin threshold temperature, an engine temperature being greater than an engine threshold temperature, and the vehicle cabin temperature being less than the second cabin threshold temperature, flowing coolant of an engine coolant system through a heat exchanger configured to heat a vehicle cabin.

11. The method of claim 6, wherein adjusting operation of the cabin air conditioning system in the consumption optimization mode includes:
responsive to a vehicle cabin temperature being greater than the first cabin threshold temperature, the second cabin threshold temperature, and the third cabin threshold temperature, energizing a compressor of the cabin air conditioning system to flow cooled air into a vehicle cabin and not flowing coolant of an engine coolant system through a heat exchanger configured to heat the vehicle cabin.

12. The method of claim 6, further comprising:
comparing the first fuel consumption rate to a second fuel consumption rate stored in the computer-readable memory and displaying a difference between the first fuel consumption rate and the second fuel consumption rate on a display device within a vehicle cabin, wherein the first fuel consumption rate corresponds to an average rate of fuel consumed by the engine for a duration since a most recent cold start of the engine, and wherein the second fuel consumption rate corresponds to an average rate of fuel consumed by the engine prior to the most recent cold start and following a cold start immediately prior to the most recent cold start.

13. The method of claim 6, further comprising:
comparing the first fuel consumption rate to a second fuel consumption rate stored in computer-readable memory and displaying a difference between the first fuel consumption rate and the second fuel consumption rate on a display device within a vehicle cabin, wherein the first fuel consumption rate corresponds to an average rate of fuel consumed by the engine for a duration since a most recent refueling event of the vehicle, and wherein the second fuel consumption rate corresponds to an average rate of fuel consumed by the engine prior to the most recent refueling event and following a refueling event immediately prior to the most recent refueling event.

14. The method of claim 6, wherein the first fuel consumption rate is measured by the controller by measuring a temperature of coolant flowing through the engine and an amount of engine load.

15. The method of claim 6, wherein the first cabin threshold temperature is a minimum cabin temperature, the second cabin threshold temperature is an operator-desired cabin temperature, and the third cabin threshold temperature is a maximum cabin temperature;
   wherein coolant is sent to the cabin heat exchanger until a measured vehicle cabin temperature reaches the first cabin threshold temperature, and
   then coolant is prevented from flowing to the cabin heat exchanger until an engine temperature reaches a threshold engine temperature.

16. The method of claim 15, further comprising:
   displaying the first fuel consumption rate, the first cabin threshold temperature, a predicted fuel consumption rate, and a fourth cabin threshold temperature on a display device, where the fourth cabin threshold temperature is determined by the controller and is less than the first threshold temperature, and where the predicted fuel consumption rate is estimated by the controller by replacing the first cabin threshold temperature with the fourth cabin threshold temperature.

17. The method of claim 15, further comprising:
   displaying the first fuel consumption rate, the third cabin threshold temperature, a predicted fuel consumption rate, and a fourth cabin threshold temperature on a display device, with the fourth cabin threshold temperature being determined by the controller and being greater than the third threshold temperature, and with the predicted fuel consumption rate being estimated by the controller by replacing the third cabin threshold temperature with the fourth cabin threshold temperature.

18. The method of claim 6, further comprising displaying the adjustment to the first cabin temperature threshold needed to achieve the projected fuel consumption rate and heat the cabin to the first cabin temperature threshold.

19. A method, comprising:
   adjusting operation of a cabin air conditioning system of a vehicle responsive to activation of a consumption optimization mode, a first cabin threshold temperature, a second cabin threshold temperature, and a third cabin threshold temperature received by a controller;
   the consumption optimization mode comprising controlling coolant flow to a cabin heat exchanger based on engine temperature;
   measuring a current consumption rate of an engine;
   displaying the current consumption rate and a projected fuel consumption rate;
   the projected fuel consumption rate based on operation of the cabin air conditioning system in the consumption optimization mode, adjusting the first cabin threshold temperature from a current cabin threshold temperature, and flowing coolant to a cabin heat exchanger when a cabin temperature is less than the first cabin threshold temperature;
   determining a hypothetical first fuel consumption amount for a duration of flowing coolant to the passenger compartment-heating heat exchanger in order to increase the temperature T of the passenger compartment to the second cabin threshold temperature;
   determining a hypothetical second fuel consumption amount is determined for the duration in which coolant flows to the passenger compartment-heating heat exchanger in order to increase the temperature T of the passenger compartment to the first cabin threshold temperature which is lower than the second cabin threshold temperature; and
   determining a difference between the first hypothetical fuel consumption amount and the hypothetical second fuel consumption amount.

* * * * *